(12) United States Patent
Munroe

(10) Patent No.: US 6,375,035 B1
(45) Date of Patent: Apr. 23, 2002

(54) MATERIAL FEEDER, DISPENSING MEMBER AND METHOD

(75) Inventor: Robert A. Munroe, Ashburnham, MA (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 09/624,108

(22) Filed: Jul. 24, 2000

(51) Int. Cl.$^7$ .............................................. G01F 13/00
(52) U.S. Cl. .......................... 222/1; 222/229; 222/232; 222/339; 222/410
(58) Field of Search .......................... 222/1, 411, 414, 222/229, 232, 239, 242, 410

(56) References Cited

U.S. PATENT DOCUMENTS

| | | | |
|---|---|---|---|
| 592,774 A | * | 11/1897 | Frazier .................... 222/242 X |
| 2,673,090 A | | 3/1954 | Blumberg |
| 2,791,355 A | * | 5/1957 | Morgan, Jr. ................. 222/411 |
| 2,954,982 A | | 10/1960 | Saiberlich |
| 3,873,652 A | | 3/1975 | Ramacciotti |
| 4,034,898 A | * | 7/1977 | Marttilla et al. ......... 222/242 X |
| 5,125,535 A | * | 6/1992 | Ohlman .................. 222/239 X |
| 5,223,137 A | | 6/1993 | Hattari et al. |
| 5,551,492 A | | 9/1996 | Rack et al. |

* cited by examiner

Primary Examiner—Kenneth Bomberg
(74) Attorney, Agent, or Firm—Mary E. Porter; Richard L. Sampson

(57) ABSTRACT

A material feeder having a flexible rotary dispensing member allows precise control over quantity and flow character of material being dispensed. Also, provided are a flexible dispensing member for a rotary material feeder, and a method of adjusting a dispensing amount on a rotary material feeder by adjusting a curvature of the rotating dispensing member.

20 Claims, 3 Drawing Sheets

MATERIAL FEEDER, DISPENSING MEMBER AND METHOD

BACKGROUND OF THE INVENTION

1. Technical Field

This invention relates to material feeders, and more particularly to a material feeder having a flexible rotary dispensing member.

2. Background Information

Material feeders are used to accurately dispense various materials in many fields. One application can be found in the handling of abrasive wheel components such as abrasive and bond particulate that is placed in molds to form abrasive grinding wheels. In this setting, a material feeder may be combined with a press system or mold filling system that includes a weighing scale. Adjusting the feed rate of material dispensing is used to effect precise material weigh out. One type of material feeder includes a hopper having an opening to allow material to flow therefrom to an adjacent rotary dispensing member that receives the material. The rotary dispensing member then dispenses the material to an adjacent area as it rotates. An example of this type feeder is disclosed in U.S. Pat. No. 3,873,652, which is incorporated herein by reference.

While these rotary material feeders are effective in many applications, they are limited in a number of ways by their restricted control of feed rate, or flow volume. In most feeders of this type, adjustment of the feed rate is provided by changing the speed of rotation of the rotary dispensing member only. Another way to adjust feed rate is to control the gap size between the hopper opening and the rotary dispensing member. Unfortunately, the gap size is oftentimes predetermined by the position of the feeder's output shaft and the specific dispensing member chosen. In technologies where the amount of material required is very specific, e.g., in the manufacture of abrasive wheels, the resulting imprecision in the feed rate is a problem. A need to slowly diminish the feed rate is also not addressed by this type material feeder. In addition, these feeders suffer from a tendency to permit material to flow even after cessation of rotation of the dispensing member.

Another limitation is that the variety of material, and in particular the size of material, that a feeder can handle is restricted by the gap size between the hopper opening and specific rotary dispenser member used. Switching one dispensing member for another is time consuming and inconvenient, and adjustment of the position of the rotary dispensing member relative to the hopper opening requires complex and costly mechanisms.

One attempt to provide more accurate dispensing is disclosed in U.S. Pat. No. 5,551,492, which is incorporated herein by reference. This reference provides a rotary dispensing member having slots to receive a measured amount of material. While this system may provide more accurate dispensing, it does not provide continuous flow of material and requires a relatively complex construction. The system is also limited in that it has difficulty handling differing sized material and is difficult to clean.

Other material feeders that use vibration, augers or belts to feed material also have restrictive ranges of feed rate. These type feeders may also be difficult to clean between runs of different type material.

A need thus exists for an improved material feeder having a wide range of feed rate adjustability, ease of cleanup and accommodation of differing size materials.

SUMMARY OF THE INVENTION

According to an embodiment of this invention, a material feeder comprises a hopper having an opening, and a flexible rotary dispensing member positioned adjacent the opening. The flexible rotary dispensing member has an adjustable curvature that determines the gap distance between the member and hopper opening.

A second aspect of the invention provides a dispensing member for a rotary material feeder, the dispensing member being made of a flexible material.

The invention provides, in a third aspect, a method of operating a rotary material feeder having a hopper and a rotating dispensing member positioned adjacent an opening of the hopper, the method comprising the steps of: supplying material to the hopper, providing a flexible rotating dispensing member, adjusting a curvature of the rotating dispensing member, and rotating the flexible rotating dispensing member.

The above and other features and advantages of the invention will be more readily apparent from a reading of the following more detailed description of various aspects of the invention taken in conjunction with the accompanying drawings.

DETAILED DESCRIPTION OF THE PREFERRED EMBODIMENTS

Figure 1:
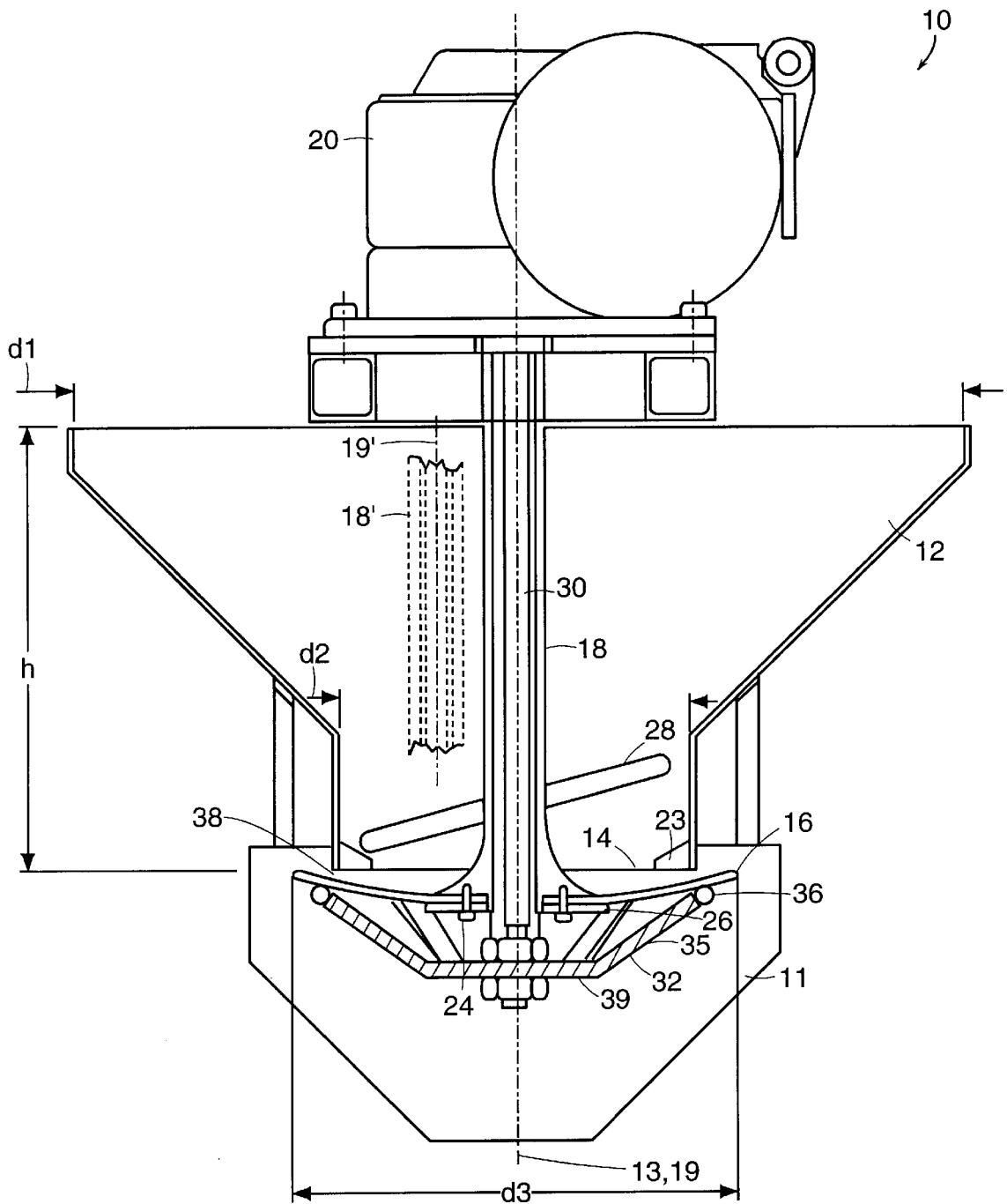
FIG. 1 is a cross-sectional view of an embodiment of a material feeder of the present invention.

Referring to the figures set forth in the accompanying Drawings, the illustrative embodiments of the present invention will be described in detail hereinbelow. Like features shown in the accompanying Drawings shall be indicated with like reference numerals and similar features as shown in alternate embodiments in the Drawings shall be indicated with similar reference numerals.

Briefly described, the invention is a material feeder 10 including a flexible and shape-adjustable dispensing member 16 adjacent an opening 14 of a material hopper 12. As will be described in more detail below, member 16 being flexible and shape-adjustable allows for an adjustable gap distance between hopper 12, or hopper opening 14, and flexible member 16.

Referring to the drawings, a rotary dispensing member type material feeder 10, in accordance with the invention, is disclosed. As shown in FIG. 1, material feeder 10 has a material hopper 12 having an opening 14, through which material may flow, and a flexible rotary dispensing member 16 positioned adjacent the opening. Member 16 is preferably a disk-shaped member made of a flexible material, e.g., natural or synthetic rubber, polymeric material such as silicone, flouropolymer, polyolefin, etc. Member 16 may, however, be provided with a preset curvature, if desired. Hopper 12 may also include lump breakers 23 adjacent opening 14 to aid in breaking up lumps of material. Material feeder 10 may also include a frusto-conical housing 11 below flexible member 16 to prevent material from spraying during operation.

Flexible member 16 is mounted on a proximal end of an output shaft 18 that is rotatably coupled to material feeder 10 to permit shaft 18 to be rotated about its longitudinal axis 19. Longitudinal axis 19 is preferably aligned with a central axis 13 of hopper 12. However, as shown in phantom in FIG. 1, output shaft 18' may be offset laterally such that longitudinal axis 19' is not aligned with central axis 13 of hopper 12. By "laterally" is meant a direction substantially orthogonal relative to central axis 13 of hopper 12. A distal end of shaft 18 is coupled to a source of rotary power 20. The source of rotary power 20 serves as a means for rotating the rotary dispensing member 16. The source of rotary power 20 is any type of drive system, e.g., a motor, well known to those skilled in the art and may be easily modified by the skilled artisan in accordance with the teachings of the present invention. Although flexible member 16 may be coupled to output shaft 18 in a variety of ways familiar to those skilled in the art, in a preferred embodiment, flexible member 16 includes a series of apertures 22, shown best in FIG. 2, that receive threaded fasteners 24 therethrough. Threaded fasteners 24 are threadably coupled to the proximal end of output shaft 18. A reinforcing plate 26 may also be provided to prevent tearing of flexible member 16.

Output shaft 18 extends substantially centrally through hopper 12, extending axially a predetermined distance beyond opening 14. Shaft 18 may include a material agitator 28 thereon. Extending concentrically within output shaft 18 is an adjustable movable element 30, preferably in the form of a shaft. Movable element 30 is disposed for axial movement within, and rotation with, output shaft 18. Adjustment of movable element 30 may be provided in any known manner for axial adjustment, e.g., a motor-driven worm gear, a manual pinned adjustment, hydraulic, or pneumatic actuators, etc. In a preferred embodiment, movement of movable element 30 is provided by some electronic control for precision purposes.

Figure 2:
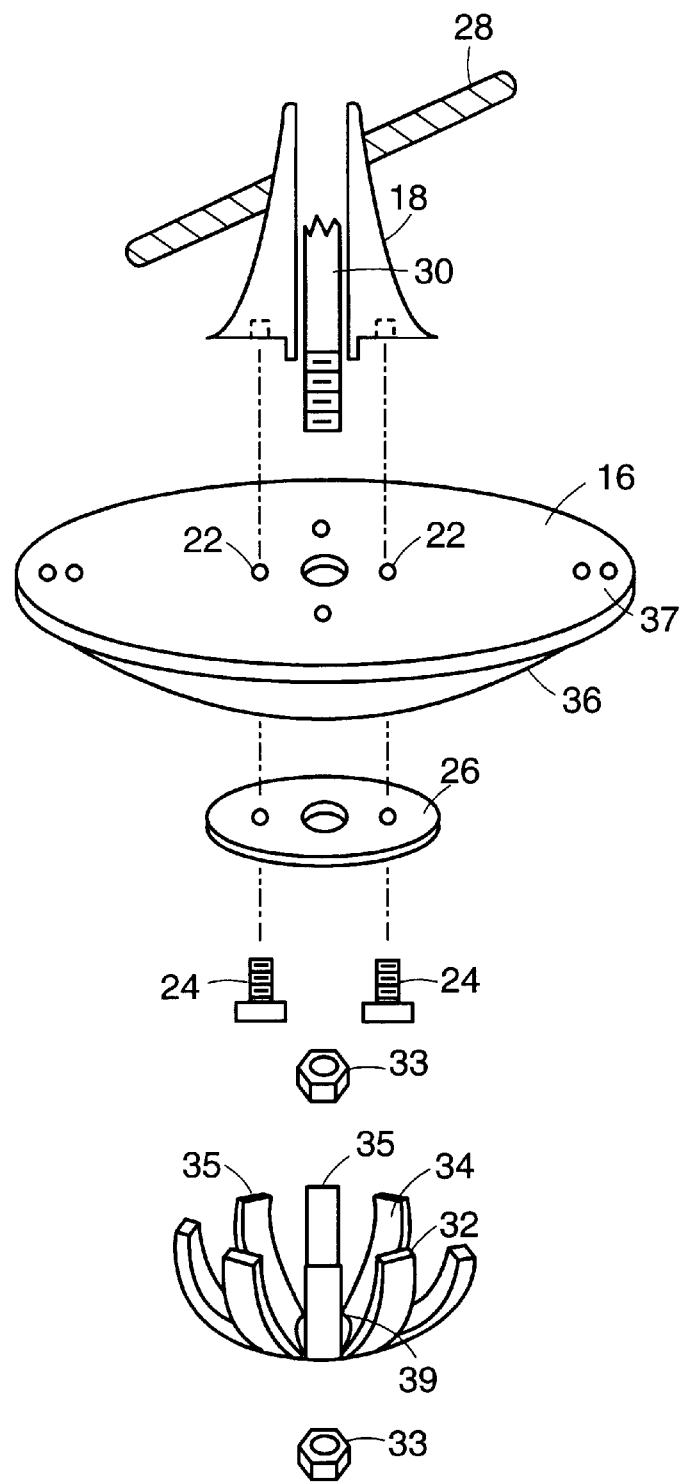
FIG. 2 is an exploded view of the output shaft and a flexible dispensing member of the material feeder of FIG. 1.

Movable element 30 is coupled to a support assembly 32 that supports a periphery of flexible member 16. The combination of movable element 30 and support assembly 32 forms a means for flexing the rotary dispensing member 16. Although support assembly 32 may take a variety of forms, as shown in FIG. 2, support assembly 32 is preferably a spider assembly 34 having a number of spokes, or fingers, 35 extending from a hub 39 to a periphery of flexible member 16. Hub 39 is coupled to movable element 30 by, for example, threaded couplings 33. Flexible member 16 may include an engagement member 36 about its periphery for engagement by support assembly 32 for supporting flexible member 16. Engagement member 36 may also be a series of engagement members (not shown) selectively positioned to engage spokes 35 of support assembly 32. In the preferred embodiment shown, the underside of flexible member 16 is supported. It should be recognized, however, that the positioning of movable element 30 and output shaft 18 may be switched and support assembly 32 may support an upper surface of flexible member 16.

Figure 3:
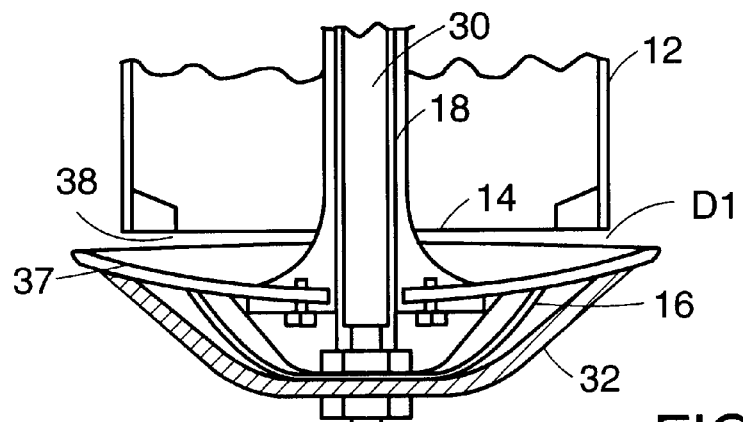
FIG. 3 is a cross-sectional view of a portion of the material feeder of FIG. 1, with the flexible dispensing member in a first position.
Figure 4:
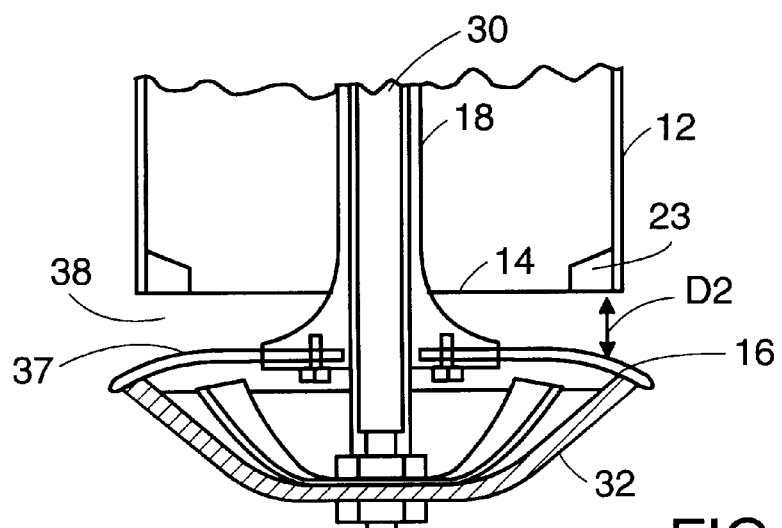
FIG. 4 is a view similar to that of FIG. 3, with the flexible dispensing member in a second position.

Referring to FIGS. 3 and 4, axial movement of movable element 30 serves to change the shape, or geometry, of flexible member 16 about its axis by changing the position of support assembly 32. In particular, the curvature of flexible member 16 is adjustable. As a result, when movable element 30 is in a first position, shown in FIG. 3, a material engaging surface 37 of flexible member 16 is concave. The first position creates a gap 38 having a size D1 between the bottom of hopper 12, or opening 14, and flexible member 16. When movable element 30 is in a second position, shown in FIG. 4, material engaging surface 37 of flexible member 16 is convex. The second position creates a gap 38 having a size D2 between the bottom of hopper 12, or opening 14, and flexible member 16. The gap size D2 when material engaging surface 37 is convex is greater than the gap size D1 when material engaging surface 37 is concave. As a result, the feed rate of material passing through gap 38 or the size of material that can pass through gap 38 during u se can be adjusted. It should be recognized that movable element 30 may also position flexible member 16 at any position between the first and second positions shown, e.g., such that flexible member 16 is flat. It should also be recognized that while material engaging surface 37 is shown as upwardly concave in the first position and upwardly convex in the second position, that direction of curvature may be altered to accommodate different material supplying systems other than hopper 12. Further adjustment of gap 38 may be provided by vertical adjustment of output shaft 18 and movable element 30 together relative to hopper 12 and opening 14. This latter adjustment may be provided in any manual or motor-driven fashion familiar to those skilled in the art.

In operation, material in hopper 12 is fed downward through opening 14 onto flexible member 16, which when rotated by output shaft 18 dispenses material out over its edge to an adjacent area. Control of the material feed rate can be adjusted by the degree of flexure or curvature (i.e., concavity or convexity) in flexible member 16. For instance, when material engaging surface 37 is concave, less material will flow through the smaller gap size D1. Further, when flexible member 16 is not rotating and material engaging surface 37 is in a concave position, shown in FIG. 3, flexible member 16 may prevent any flow of material from hopper 12 because the material is stopped by its own angle of repose, i.e., material cannot escape over the edge of flexible member 16 without further energy being provided.

Another advantage of adjustable flexible member 16 is that the size of material or types of material that may pass through gap 38 may be changed in a simple manner, e.g., without changing the rotary dispensing member, or without providing a complex vertical positioning system for both output shaft 18 and dispensing member 16. Feeder 10 is also more readily cleaned because of the simple construction provided.

During use, feeder 10 may also be provided with a number of additional mechanisms of controlling feed rate. For example, any of the following controls, alone or in combination, may be provided along with control of the curvature of flexible member 16: 1) rotational speed; 2) eccentricity between the axis of rotation of output shaft 18 and a center of opening 14; and 3) vertical position of output shaft 18 and dispensing member 16, in combination. Control of rotational speed may be provided, for example, by controlling the speed of the source of rotary power 20 in a known fashion. Higher speeds generally provide higher flow volumes. Control of any eccentricity between output shaft 18 and center of opening 14 may be provided by a manual or motor-driven mechanism to change the lateral position of output shaft 18 relative to the center of opening 14. Providing eccentricity tends to allow more material to flow from hopper 12, enables directional control of flow and generally facilitates breaking up of agglomerations or clumps of material. Such eccentricity may be provided by a static adjustment prior to rotational operation of the shaft 30. Alternatively, the eccentricity may be provided dynamically, i.e., having source of rotary power 20 continuously rotate output shaft 18 about an eccentric path, to provide improved material feed characteristics. One skilled in the art will recognize that any suitable drive mechanism may be used to provide such dynamic eccentricity, including an eccentric cam mechanism of the type commonly used, for example, in industrial grade food mixing equipment. Adjusting the vertical position of output shaft 18 and flexible member 16 together relative to hopper 12 and opening 14 may be provided by any manual or motor-driven vertical positioning mechanism well known to those skilled in the art.

Providing a flexible member 16 in combination with one or more of the above-described feed rate controls provides a relatively wide range of feed rate adjustability. For instance, a more precise slowing of the feed rate is achievable by a combined slowing of rotational speed with a reduction in gap size by making material engaging surface 37 concave, as shown in FIGS. 1 and 3. As a result, a relatively precise feeding out of material is attainable. The invention also advantageously permits the flow of material to be terminated substantially immediately upon cessation of rotation and/or displacement of the disk 16 into its concave position as shown in FIG. 3. Such immediate termination of flow represents an advantage relative to prior art auger-type systems that generally permit material to flow for a period of time after cessation of auger movement.

The invention also includes a method of operating material feeder 10, described above. The process includes the steps of: supplying material to the hopper 12, providing a flexible rotating dispensing member 16, adjusting a curvature of the rotating dispensing member 16, and rotating flexible rotating dispensing member 16. Again, adjusting the curvature of member 16 allows for adjustability of: feed rate and the size of material and type of material that may pass from hopper 12. Additional adjustability of feed rate can be achieved by the steps of: changing the speed of rotation of member 16, adjusting the axis of rotation of output shaft 18 relative to a center of opening 14, and/or adjusting the vertical position of output shaft 18 and dispensing member 16 together, as described above.

Testing of the present invention has been performed at various process conditions. The following illustrative examples are intended to demonstrate certain aspects of the present invention. It is to be understood that these examples should not be construed as limiting.

EXAMPLES

Example 1

A material feeder was fabricated substantially and shown and described herein with respect to FIGS. 1–4, having a shaft disposed concentrically with axis 19 of hopper 12. The hopper had a maximum diameter d1 of about 11.5 inches, a minimum diameter d2 of about 9.5 inches, and a height h of about 10.5 inches. The flexible member 16 had an outer diameter d3 of about 12 inches, and was sufficiently flexible so as to provide a gap 38 size ranging from about ¼ inch in the first (concave, as in FIG. 3) position to about 2 inches in the second (convex, as in FIG. 4) position. A motor was used to rotate shaft 18 within a range of approximately 10 to 80 rpm. Tests were performed using this exemplary feeder with hopper 12 filled with wet sand (makes a ball when squeezed). With the material engaging surface 37 in its concave position, and a rotational speed of about 10% of maximum, the feeder took 46 seconds to empty hopper 12 to about half volume. Additional tests at progressively increased rotational speeds successfully yielded increased material feed rates.

Example 2

Additional testing was performed substantially as set forth in Example 1, with the material engaging surface 37 in its convex position, i.e., with a gap 38 size of approximately 2 inches. The material feed rate progressively increased with increased shaft rotation speed. As expected, the overall feed rates of Example 2 were greater than those of Example 1, thus indicating successful material feeding at a wide range of feed rates.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

What is claimed is:

1. A material feeder comprising:

a hopper having an opening;

a flexible rotary dispensing member positioned adjacent the opening;

means for flexing the rotary dispensing member; and means for rotating the rotary dispensing member.

2. The material feeder of claim 1, wherein:

the means for flexing the rotary dispensing member comprises a support assembly coupled to a side of the flexible rotary member.

3. The material feeder of claim 1, wherein:

the means for flexing the rotary dispensing member comprises a movable element coupled to a support assembly.

4. The material feeder of claim 1, wherein:

movement of a movable element changes the shape of the flexible rotary member.

5. The material feeder of claim 4, wherein the flexible rotary member has a material engaging surface, and movement of the movable element moves the flexible rotary member between a first position in which the material engaging surface is concave and a second position in which the material engaging surface is convex.

6. The material feeder of claim 5, wherein the material engaging surface is upwardly concave in the first position and upwardly convex in the second position.

7. The material feeder of claim 4, wherein movement of the movable element changes the size of a gap between a periphery of the flexible rotary member and the opening of the hopper.

8. The material feeder of claim 2, further comprising an engagement member coupled to the side of the flexible rotary member for engagement by the support assembly.

9. The material feeder of claim 1, wherein said means for rotating comprises a motor coupled to the flexible rotary member by an output shaft.

10. The material feeder of claim 9, wherein the movable element is concentric with the output shaft.

11. The material feeder of claim 9, wherein the output shaft extends through the opening and includes a material agitator thereon.

12. The material feeder of claim 9, wherein a longitudinal axis of the output shaft is aligned with a central axis of the hopper.

13. The material feeder of claim 12, wherein the output shaft is axially movable relative to the hopper.

14. The material feeder of claim 9, wherein the output shaft is laterally movable relative to the hopper.

15. The material feeder of claim 14, wherein the motor rotates the output shaft about an eccentric path.

16. The material feeder of claim 1, wherein the flexible rotary member is disk-shaped.

17. The material feeder of claim 1, wherein the flexible rotary member is made of a material chosen from the group consisting of: natural rubber, synthetic rubber and polymeric material.

18. A method of operating a rotary material feeder having a hopper, the method comprising the steps of:

supplying material to the hopper;

disposing a flexible rotating dispensing member adjacent an opening of the hopper;

adjusting a curvature of the rotating dispensing member; and rotating the flexible rotating dispensing member.

19. The method of claim 18, further comprising the step of changing the speed of rotation of the rotating dispensing member.

20. The method of claim 18, further comprising the step of adjusting the axis of rotation of the rotating dispensing member relative to a center of the opening.

* * * * *